US012754809B2

(12) United States Patent
Okutani et al.

(10) Patent No.: US 12,754,809 B2
(45) Date of Patent: Oct. 6, 2026

(54) STORAGE MANAGING SYSTEM, STORAGE MANAGING METHOD, AND STORAGE MANAGING PROGRAM

(71) Applicant: Hitachi Vantara, Ltd., Yokohama (JP)

(72) Inventors: Ryo Okutani, Tokyo (JP); Hajime Sato, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 0 days.

(21) Appl. No.: 19/079,078

(22) Filed: Mar. 13, 2025

(65) Prior Publication Data

US 2025/0390395 A1 Dec. 25, 2025

(30) Foreign Application Priority Data

Jun. 19, 2024 (JP) ................................ 2024-098588

(51) Int. Cl.
*G06F 11/1446* (2026.01)

(52) U.S. Cl.
CPC ...... *G06F 11/1469* (2013.01); *G06F 2201/84* (2013.01)

(58) Field of Classification Search
CPC ......................... G06F 11/1469; G06F 2201/84
See application file for complete search history.

(56) References Cited

U.S. PATENT DOCUMENTS

2015/0348054 A1* 12/2015 Ogawa ................. G06Q 30/018 705/317
2023/0315750 A1* 10/2023 Holroyd .................. G06F 16/27 707/610
2024/0201872 A1* 6/2024 Hayasaka ............. G06F 3/0655

FOREIGN PATENT DOCUMENTS

WO WO-2014/041761 A1 3/2014

* cited by examiner

*Primary Examiner* — Apu M Mofiz
*Assistant Examiner* — Oscar Wehovz
(74) *Attorney, Agent, or Firm* — Foley & Lardner LLP

(57) ABSTRACT

The present invention makes it possible to manage a volume appropriately. A storage managing system for managing a plurality of volumes such that a placement defining label that defines a region where data relative to each of the volumes is to be placed is assigned to the volume for management includes a CPU determining whether the region where data relative to a predetermined one of the volumes is to be placed is appropriate or not, on the basis of the placement defining label assigned to the predetermined volume, and outputting an alert indicating that the region where the data relative to the predetermined volume is to be placed is not appropriate, when determining that the region where the data is placed is not appropriate.

8 Claims, 23 Drawing Sheets

FIG. 4

41

| | GDPR | CCPA | PERSONAL INFORMATION PROTECTION LAW (JAPAN) | DISASTER PROTECTION (COUNTRY) | DISASTER PROTECTION (DISTANCE) | ... |
|---|---|---|---|---|---|---|
| GDPR | Allowed | Not Allowed | Not Allowed | Allowed | Allowed | ... |
| CCPA | Not Allowed | Allowed | Not Allowed | Allowed | Allowed | ... |
| PERSONAL INFORMATION PROTECTION LAW (JAPAN) | Not Allowed | Not Allowed | Allowed | Allowed | Allowed | ... |
| DISASTER PROTECTION (COUNTRY) | Allowed | Allowed | Allowed | Allowed | Allowed | ... |
| DISASTER PROTECTION (DISTANCE) | Allowed | Allowed | Allowed | Allowed | Allowed | ... |
| ... | ... | ... | ... | ... | ... | ... |

FIG. 5

42

| DATA PROTECTION TYPE / REGION | CN/Shanghai | DE/Berlin | JP/Tokyo | US/Chicago | ... |
|---|---|---|---|---|---|
| GDPR | PRESENCE OF RISK | ABSENCE OF RISK | ABSENCE OF RISK | ABSENCE OF RISK | ... |
| CCPR | PRESENCE OF RISK | PRESENCE OF RISK | PRESENCE OF RISK | ABSENCE OF RISK | ... |
| PERSONAL INFORMATION PROTECTION LAW (JAPAN) | PRESENCE OF RISK | PRESENCE OF RISK | ABSENCE OF RISK | PRESENCE OF RISK | ... |
| DISASTER PROTECTION (COUNTRY) | * DEPENDING ON COUNTRY AS COPY SOURCE | * DEPENDING ON COUNTRY AS COPY SOURCE | * DEPENDING ON COUNTRY AS COPY SOURCE | * DEPENDING ON COUNTRY AS COPY SOURCE | ... |
| DISASTER PROTECTION (DISTANCE) | * DEPENDING ON DISTANCE TO COPY SOURCE | * DEPENDING ON DISTANCE TO COPY SOURCE | * DEPENDING ON DISTANCE TO COPY SOURCE | * DEPENDING ON DISTANCE TO COPY SOURCE | ... |
| ... | ... | ... | ... | ... | ... |
| NO PENDING ISSUE | ABSENCE OF RISK | ABSENCE OF RISK | ABSENCE OF RISK | ABSENCE OF RISK | ... |

FIG. 6

43

| | CN/Shanghai | DE/Berlin | JP/Tokyo | US/Chicago | ... |
|---|---|---|---|---|---|
| CN/Shanghai | 0km | 8392km | 1644km | 11349km | ... |
| DE/Berlin | 8392km | 0km | ... | ... | ... |
| JP/Tokyo | 1644km | ... | 0km | ... | ... |
| US/Chicago | 11349km | ... | ... | 0km | ... |
| ... | ... | ... | ... | ... | 0km |

FIG. 7

44a 44b 44

| DATA PROTECTION TYPE | REQUIREMENT FULFILLING REGION |
|---|---|
| GDPR | IRELAND REGION, LONDON REGION, ··· |
| CCPA | CANADA (CENTRAL PART) REGION |
| DISASTER PROTECTION (COUNTRY) | REGION TO WHICH COUNTRY AS COPY SOURCE DOES NOT BELONG |
| DISASTER PROTECTION (DISTANCE) | REGION AT PREDETERMINED DISTANCE FROM COPY SOURCE OR FARTHER |
| ··· | ··· |

FIG. 8

45 45a 45b

| REGION | PRICE |
|---|---|
| LONDON REGION | $XXXX |
| CANADA (CENTRAL PART) REGION | $YYYY |
| ASIA PACIFIC (TOKYO) | $ZZZZ |
| ... | ... |

STORAGE MANAGING SYSTEM, STORAGE MANAGING METHOD, AND STORAGE MANAGING PROGRAM

BACKGROUND OF THE INVENTION

1. Field of the Invention

The present invention relates to a technology for managing placement of data relative to volumes in data storage.

2. Description of the Related Art

In using data storage, it is necessary to pay attention to management of data volumes depending on types of data and the destinations to which the pieces of data are to be transferred.

For example, in regions where there are legal restrictions, such as general data protection regulations (GDPR), that impose limitations on locations for storing data including sensitive information such as personal information, violations of the limitations applied to the relevant locations could result in punishments such as fines. Moreover, in a case where a region is to be set as a remote copy destination in cloud services, for example, if the remote copy destination is not set to an appropriate location due to error in settings by the cloud services and by users, then it may run the risk of a violation of legal restrictions. Further, in terms of disaster recovery, there is a risk that disaster recovery does not appropriately function if a remote copy destination of data is present in a nearby region.

For example, WO2014/041761 discloses a technology for assessing a legal or contractual risk in transfer of applications and data between data centers.

SUMMARY OF THE INVENTION

When data storage is in use, there may be occasions where it is preferable to manage locations for storing data in much smaller units than in units per application. For example, in a case where only a small number of pieces of data used in an application is sensitive information, if all the pieces of data used in the application are stored in a location that fulfils relevant legal requirements, then the data storage may possibly suffer a low level of efficiency and have a detrimental effect on the cost of data management.

The present invention has been made in such circumstances described above, and it is therefore an object of the present invention to provide a technology that is able to appropriately manage volumes.

In order to achieve the above object, there is provided in accordance with an aspect of the present invention a storage managing system for managing a plurality of volumes such that a placement defining label that defines a region where data relative to each of the volumes is to be placed is assigned to the volume for management, including a processor determining whether the region where data relative to a predetermined one of the volumes is to be placed is appropriate or not, on the basis of the placement defining label assigned to the predetermined volume, and outputting an alert indicating that the region where the data relative to the predetermined volume is to be placed is not appropriate, when determining that the region where the data is to be placed is not appropriate.

According to the aspect of the present invention, it is possible to manage the volumes appropriately.

BRIEF DESCRIPTION OF THE DRAWINGS

FIG. 4 is a configurational diagram of a combination table according to the present embodiment;

FIG. 5 is a configurational diagram of a risk table according to the present embodiment;

FIG. 6 is a configurational diagram of a distance table according to the present embodiment;

FIG. 7 is a configurational diagram of a requirement fulfilling region table according to the present embodiment;

FIG. 8 is a configurational diagram of a price table according to the present embodiment;

DESCRIPTION OF THE PREFERRED EMBODIMENT

A preferred embodiment of the present invention will be described in detail below with reference to the accompanying drawings. The preferred embodiment to be described below should not be construed as limiting the present invention as defined in the attached claims. The elements described in the embodiment and all combinations thereof may not necessarily be indispensable for solving means of the present invention.

When information is to be referred to hereinafter, it may be expressed as “AAA table.” However, information may be expressed in any data structure. In order to indicate that information does not depend on any data structure, “AAA table” may be called “AAA information.”

While a process may be described hereinafter as being performed by a “program” acting as a subject of the operation, since the program is executed by a processor to execute a predetermined process, using at least one of a storage unit and an interface as needed, the subject of the process may also be described as a processor or a computer or computer system that has a processor. The program may be installed from a program source into the computer. The program source may be a program distributing server or a storage medium that can be read by the computer. Also, in the following description, two or more programs may be expressed as one program, and one program may be expressed as two or more programs. At least part of a process that is performed by executing a program may be implemented by a hardware circuit, e.g., an application-specific integrated circuit (ASIC) or a field-programmable gate array (FPGA).

Figure 1:
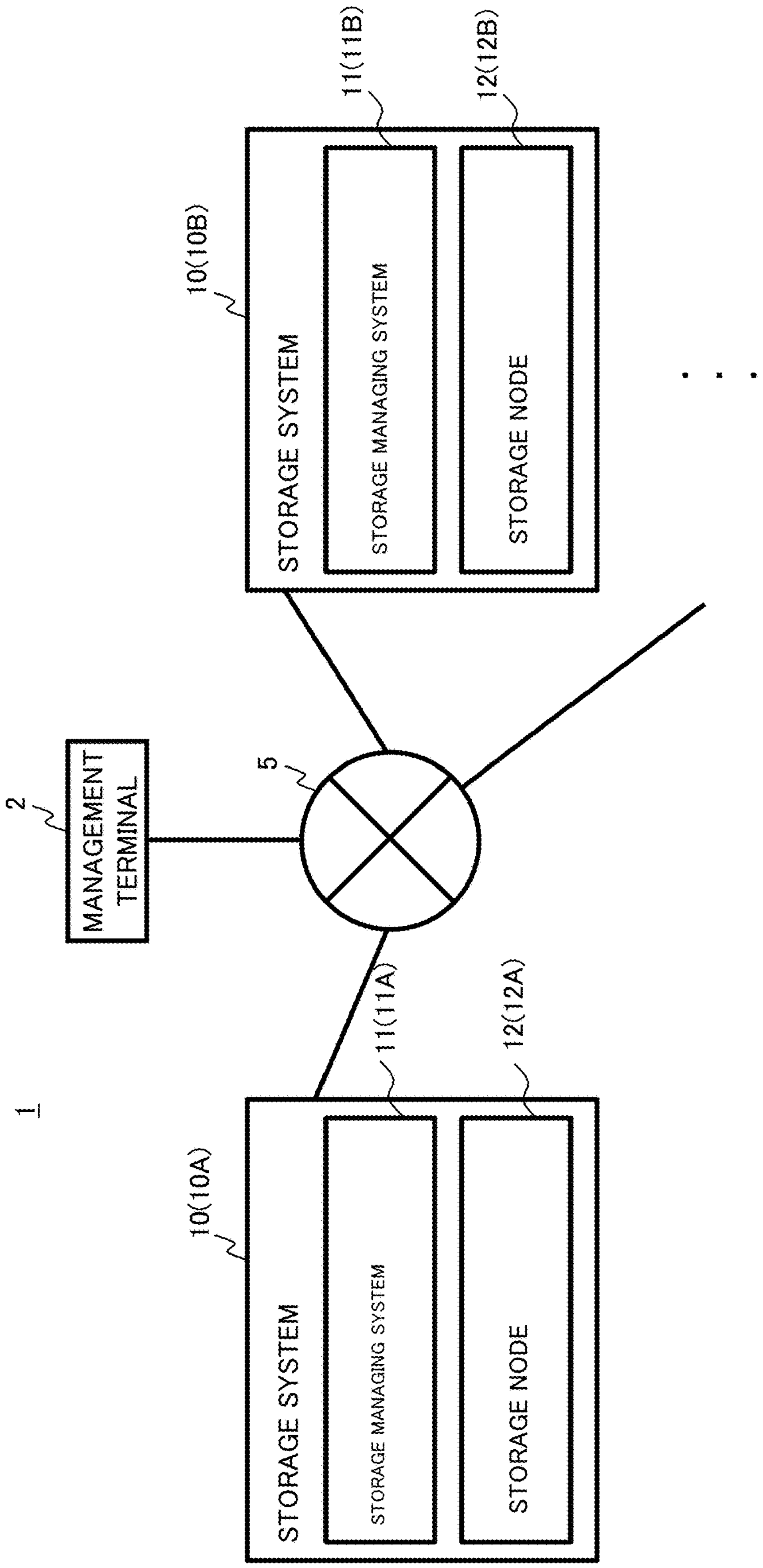
FIG. 1 is a block diagram of an overall configuration of a computer system according to an embodiment of the present invention.

FIG. 1 illustrates in block form an overall configuration of a computer system 1 according to an embodiment of the present invention.

The computer system 1 includes a management terminal 2 and a plurality of storage systems 10 (10A and 10B). The management terminal 2 and the storage systems 10 are interconnected by a network 5. The network 5 is a communication network such as a wired local area network (LAN), a wireless LAN, or a wide area network (WAN), for example.

The management terminal 2 includes a computer such as a personal computer (PC), which is operable by a user or an administrator to manage volumes stored in the storage systems 10.

Each of the storage systems 10 (10A and 10B) is made up of one or more physical or virtual servers. Each of the storage systems 10 includes a storage managing system 11 and a storage node 12. Each of the storage managing system 11 and the storage node 12 may include a physical or virtual server.

The storage node 12 has a storage device for storing volumes therein, and performs a process to write volume data into the storage device and read volume data from the storage device. According to the present embodiment, the storage node 12 can associate a volume with a data protection type label, i.e., an example of placement defining label, representing information for defining a region where pieces of data are to be placed. The information for defining a region where pieces of data are to be placed may refer to information for defining a region where pieces of data may be placed or information for defining a region where pieces of data may not be placed. The data protection type label may represent, for example, either no concern (tagged, for example, by a numerical value of 0) indicating no concern about protection for a region where data is to be placed, GDPR (tagged, for example, by a numerical value of 1) indicating an entity to be protected by GDPR as legal restrictions, California Consumer Privacy Act (CCPA) (tagged, for example, by a numerical value of 2) indicating an entity to be protected by CCPA as legal restrictions, Act on the Protection of Personal Information (tagged, for example, by a numerical value of 3) indicating an entity to be protected by the Japanese private information protection law as legal restrictions, disaster protection (country) (tagged, for example, by a numerical value of 4) indicating an entity to be protected against a disaster by setting a copy destination to a country different from the country of a copy source for the purpose of disaster protection, disaster protection (distance) (tagged, for example, by a numerical value of 5) indicating an entity to be protected against a disaster by setting the distance between a copy destination and a copy source to a predetermined distance or longer for the purpose of disaster protection, or the like. A plurality of data protection type labels may be selected and set for an entity to be protected as long as they cause no contradiction with regard to the entity to be protected.

The storage managing system 11 performs a process of managing volumes stored in the storage node 12. According to the present embodiment, the storage managing system 11 is able to set a data protection type label for a volume according to an instruction from the user.

Figure 2:
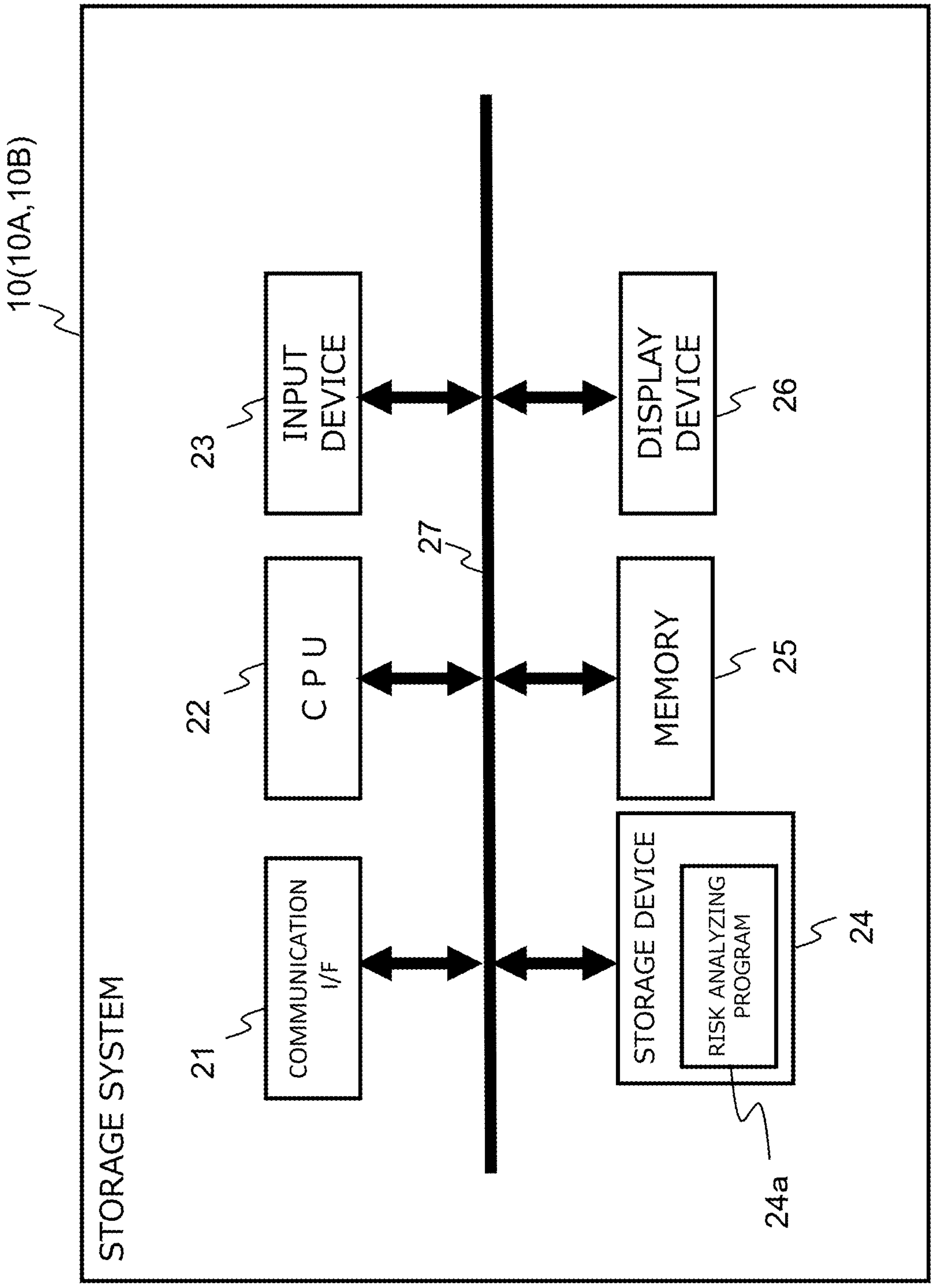
FIG. 2 is a block diagram of a hardware configuration of a storage system according to the present embodiment.

FIG. 2 illustrates in block form a hardware configuration of the storage system 10 according to the present embodiment.

The storage system 10 includes a PC, a computer of general-purpose server, or the like, for example. The storage system 10 includes a communication interface (I/F) 21, a central processing unit (CPU) 22, an input device 23, a storage device 24, a memory 25, and a display device 26. The communication interface 21, the CPU 22, the input device 23, the storage device 24, the memory 25, and the display device 26 are interconnected by a bus 27.

The communication I/F 21 is an interface such as a wired LAN card or a wireless LAN card, for example, and communicates with other devices, e.g., the management terminal 2 and the other storage systems 10, via the network 5.

The CPU 22 represents an example of a processor and performs various types of processes according to programs stored in the memory 25 and/or the storage device 24.

The memory 25 is a random access memory (RAM), for example, and stores programs executed by the CPU 22 and necessary information.

The storage device 24 includes a hard disk, a flash memory, or the like, for example, and stores programs to be executed by the CPU 22, data to be used by the CPU 22, volumes of user data to be used by the user, and the like. According to the present embodiment, the storage device 24 stores a risk analyzing program 24*a* as a program and also stores as information a combination table 41, a risk table 42, a distance table 43, a requirement fulfilling region table 44, a price table 45, time zone setting information 46, and the like, to be described later.

The input device 23 is a mouse, a keyboard, or the like, for example, and accepts information input by the user. The display device 26 is a display, for example, and outputs and displays a user interface including various types of information.

Figure 3:
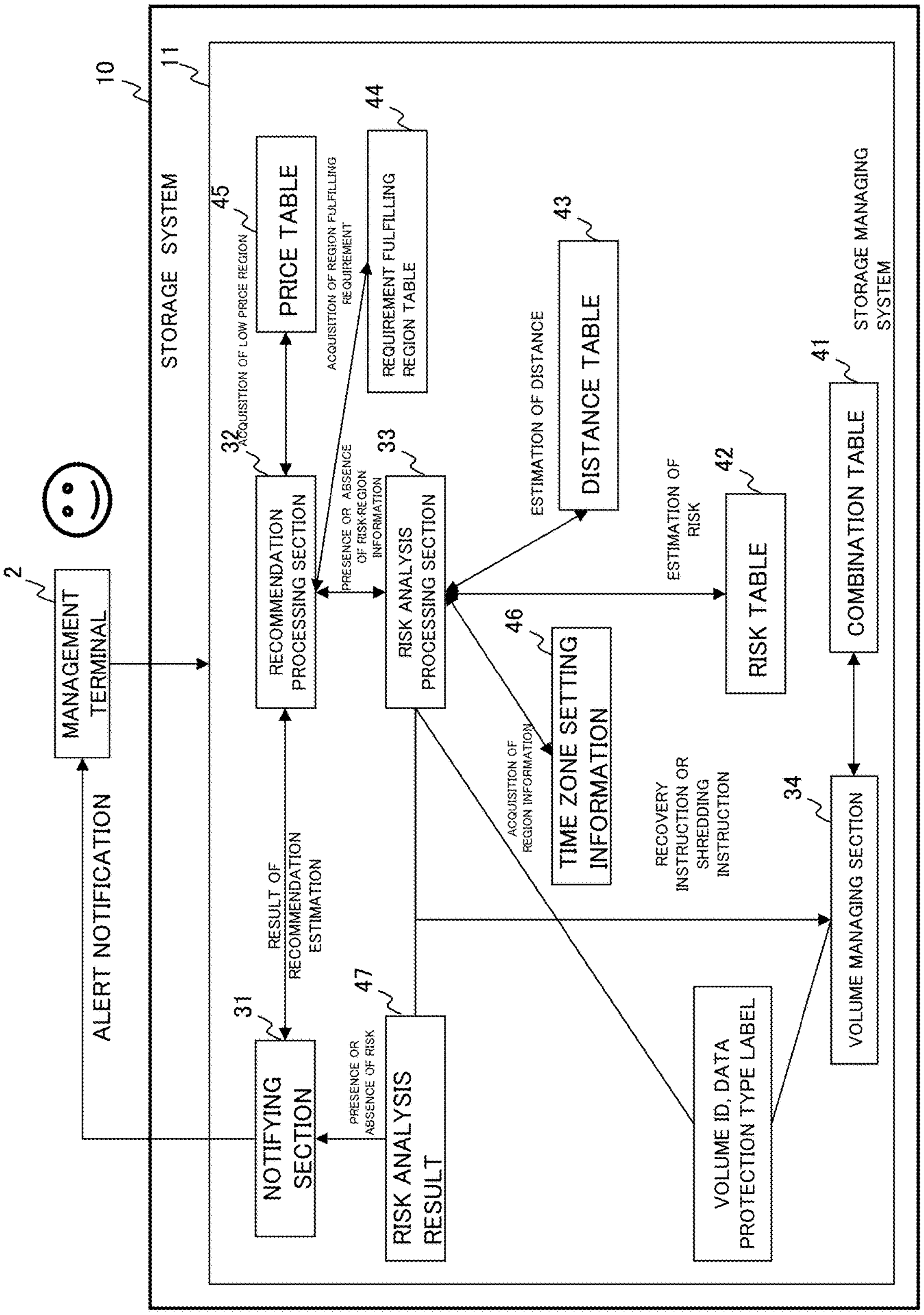
FIG. 3 is a block diagram of functions of the storage system that are involved in managing a volume risk in the computer system according to the present embodiment.

FIG. 3 illustrates in block form the functions of the storage system 10 that are involved in managing a volume risk in the computer system 1 according to the present embodiment. The volume risk refers to the risk of a region where a volume itself is placed as a requirement for data protection.

The storage managing system 11 of each of the storage systems 10 includes a notifying section 31, a recommendation processing section 32, a risk analysis processing section 33, a volume managing section 34, the combination table 41, the risk table 42, the distance table 43, the requirement fulfilling region table 44, the price table 45, and the time zone setting information 46. The notifying section 31, the recommendation processing section 32, the risk analysis processing section 33, and the volume managing section 34 are implemented by the CPU 22 as it executes the risk analyzing program 24*a*.

FIG. 4 illustrates the configuration of the combination table 41 according to the present embodiment.

The combination table 41 refers to a table for managing information as to whether combinations of data protection type labels to be set with respect to volumes are allowed or not.

The combination table 41 stores data protection types that can be set as data protection type labels in a vertical column and a horizontal row. The combination table 41 also has a plurality of fields defined at the crossings of the data protection type labels in the vertical column and the data protection type labels in the horizontal row. Each of the fields contains information as to whether a combination of two corresponding data protection type labels is allowed or not allowed.

The combination table 41 in FIG. 4 indicates, for example, that the data protection type labels of GDPR and CCPR are not allowed to be set in combination and the data protection type labels of GDPR and disaster protection (country) are allowed to be set in combination.

FIG. 5 illustrates the configuration of the risk table 42 according to the present embodiment.

The risk table 42 refers to a table for managing information as to whether a region involves a risk by placing therein a volume to be protected according to a data protection type or not.

The risk table 42 stores various data protection types that can be set in a vertical column, a plurality of regions in a horizontal row, and a plurality of fields defined at the crossings of the data protection type labels in the vertical column and the regions in the horizontal row. Each of the fields contains information as to whether placing a volume to be protected according to a data protection type in the storage system 10 in a corresponding region poses a risk or not. As to the disaster protection (country) and the disaster protection (distance), information as to whether placing a volume in a region faces a risk or not is not set because the risk depends on a country as a copy source or a distance to a copy destination.

It can be seen from the risk table 42 illustrated in FIG. 5, for example, that there is no risk posed by placing a volume to be protected according to GDPR in Berlin in Germany (DE/Berlin), Tokyo in Japan (JP/Tokyo), or Chicago in the US (US/Chicago).

FIG. 6 illustrates a configuration of the distance table 43 according to the present embodiment.

The distance table 43 refers to a table for managing information about the distances between regions. The distance table 43 stores a plurality of regions in a vertical column and a horizontal row and the distances between those regions in a plurality of fields defined at the crossings of the regions in the vertical column and the horizontal row.

The distance table 43 illustrated in FIG. 6 indicates, for example, that the distance between Shanghai in China (CN/Shanghai) and Berlin in Germany (DE/Berlin) is 8392 km.

FIG. 7 illustrates a configuration of the requirement fulfilling region table 44 according to the present embodiment.

The requirement fulfilling region table 44 refers to a table managing regions that fulfill or satisfy requirements for data protection types. The requirement fulfilling region table 44 stores as many entries as the data protection types. The entries stored in the requirement fulfilling region table 44 include fields of data protection types 44*a* and requirement fulfilling regions 44*b*. The fields of the data protection types 44*a* store data protection types corresponding to the entries. The fields of the requirement fulfilling regions 44*b* store the names of regions that fulfill requirements for data with respect to the data protection types corresponding to the entries. In a case where the storage system 10 is provided by Amazon Web Service (AWS), the names of the regions may be the names of AWS regions.

FIG. 8 illustrates the configuration of the price table 45 according to the present embodiment.

The price table 45 stores prices for using the storage systems 10 in regions where the storage systems 10 are placed. The price table 45 stores entries with respect to the respective regions. The entries stored in the price table 45 include fields of regions 45*a* and fields of prices 45*b*. The fields of the regions 45*a* store the names of the regions corresponding to the entries. The fields of the prices 45*b* store prices (placement costs) for using the storage systems 10 in the regions corresponding to the entries.

The time zone setting information 46 includes information regarding the identifications (IDs) of time zones and country codes of regions where the storage systems 10 including the storage nodes 12 managed by the storage managing systems 11 are placed. The IDs of the time zones and the country codes may be of values based on the time zone database of the International Assigned Numbers Authority (IANA).

Described with reference to FIG. 3 again, on the basis of an instruction from the administrator via the management terminal 2, the volume managing section 34 performs a process of accepting the designation of a data protection type to be assigned to a volume that is to be stored in the storage node 12 or that has been stored in the storage node 12 and associating a data protection type label with the volume. When the volume managing section 34 accepts a combination of multiple data protection types, the volume managing section 34 refers to the combination table 41 and designates only those combinations of multiple data protection types that are allowed. The volume managing section 34 performs a process of accepting a volume (target volume) for which a risk is to be determined with respect to a region where the volume is to be placed from the risk analysis processing section 33, acquires a data protection type label associated with the target volume, and notifies the risk analysis processing section 33 of the acquired data protection type label.

In addition, the volume managing section 34 acquires a snapshot of a volume stored in the storage node 12. That is, the volume managing section 34 creates a snapshot volume in the storage node 12. The timing of the acquisition of the snapshot may be one or more of the time when the volume is generated, the time when the setting of the data protection type label for the volume is changed, the time when a remote copy setting is made, and a periodic cycle, e.g., once an hour, for example. The volume with respect to which the snapshot is to be acquired may also be a volume with respect to which a data protection type other than the data protection type label representing no concern is set. Note that the snapshot contains information on the data protection type label associated with the volume at the time the snapshot is acquired.

The risk analysis processing section 33 accepts the designation of a target volume by the administrator via the management terminal 2 and notifies the volume managing section 34 of an instruction for acquiring a data protection type for the target volume. The risk analysis processing section 33 receives the data protection type for the target volume from the volume managing section 34. The risk analysis processing section 33 refers to the time zone setting information 46 and the risk table 42, performs an analyzing process of analyzing whether a region where the target volume is to be placed (placement position) involves a risk (volume risk) or not with respect to the data protection type represented by the data protection type label regarding the target volume, and notifies the recommendation processing section 32 and the notifying section 31 of a risk analysis result 47.

The recommendation processing section 32 receives information as to whether there is a volume risk or not and information regarding the region where the volume is placed from the risk analysis processing section 33. If there is a volume risk, then the recommendation processing section 32 refers to the requirement fulfilling region table 44, acquires information about regions that fulfill the requirement for the data protection type with respect to the target volume, refers to the price table 45, acquires information regarding a region whose fee for using it is low among the regions, and sends the notifying section 31 the acquired information regarding the region as an estimated recommendation result.

The notifying section 31 receives the risk analysis result 47 including information as to whether there is a volume risk or not and a risk analysis execution time from the risk analysis processing section 33. If there is a volume risk, then the notifying section 31 notifies the management terminal 2 of an alert. At this time, the notifying section 31 may also notify the management terminal 2 of the estimated recommendation result received from the recommendation processing section 32.

Figure 9:
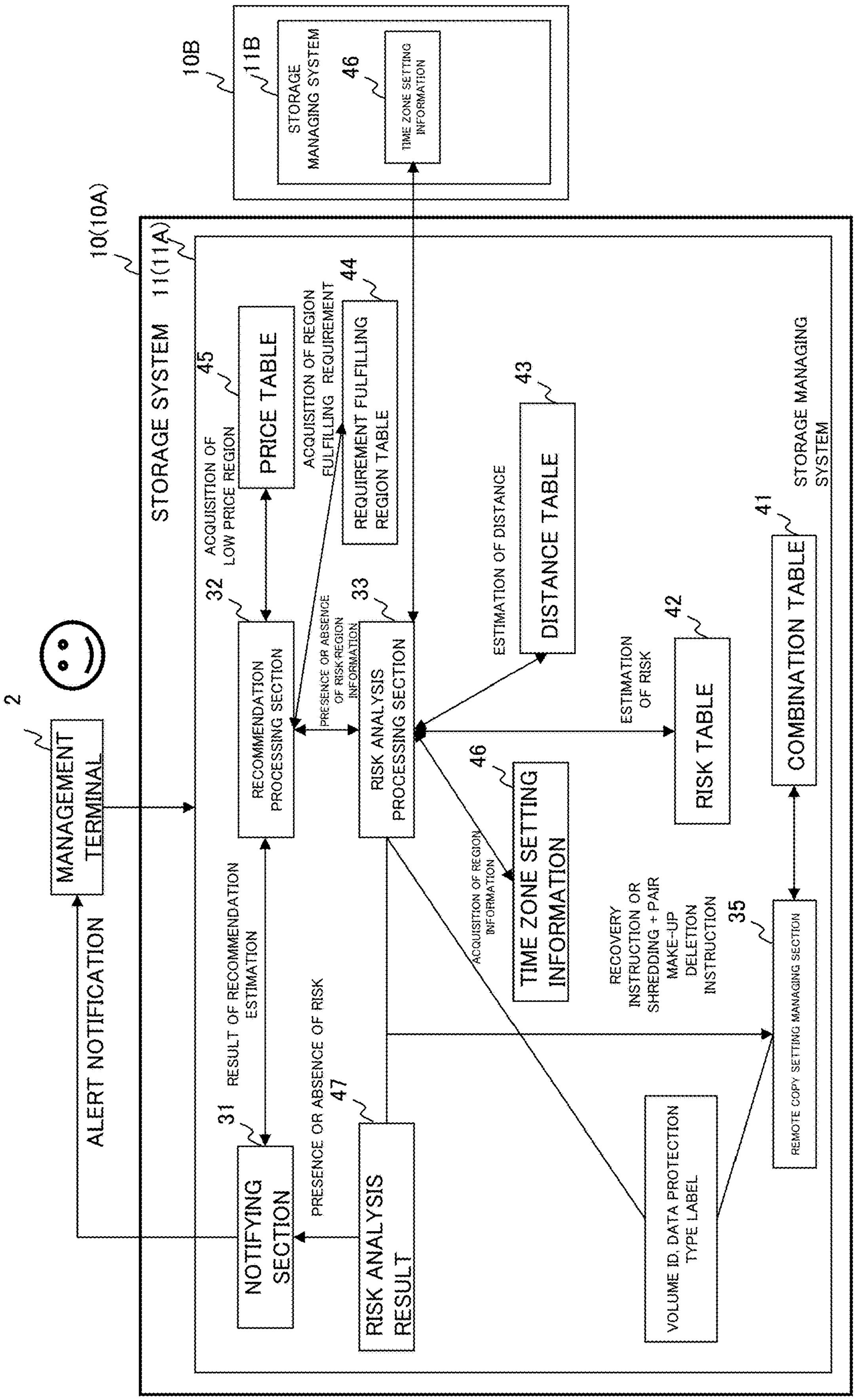
FIG. 9 is a block diagram of the functions of the storage system that are involved in managing a copy risk in the computer system according to the present embodiment.

FIG. 9 illustrates in block form the functions of the storage system 10 that are involved in managing a copy risk in the computer system 1 according to the present embodiment. The copy risk refers to a risk posed on a region where a volume is to be placed as a copy destination with respect to requirements for data protection types.

A storage managing system 11A includes a remote copy setting managing section 35 in addition to the other functions illustrated in FIG. 3. The remote copy setting managing section 35 is implemented by the CPU 22 as it executes the risk analyzing program 24*a*. A storage managing system 11B, which is a storage managing system included in the storage system 10B, stores time zone setting information 46.

On the basis of an instruction from the administrator via the management terminal 2, the remote copy setting managing section 35 accepts the designation of volumes at a copy source and a copy destination between which a remote copy is to be carried out, and stores copy pair information regarding the volumes at the copy source and the copy destination in the storage node 12. Moreover, on the basis of an instruction from the administrator via the management terminal 2, the remote copy setting managing section 35 performs a process of accepting the designation of a data protection type to be assigned to the volume at the copy source and associating the volume with a data protection type label.

The remote copy setting managing section 35 performs a process of accepting the volume (target volume) at the copy source for remote copy, for which a copy risk is to be determined, from the risk analysis processing section 33, acquiring a data protection type label associated with the target volume, and notifying the risk analysis processing section 33 of the acquired data protection type label.

The remote copy setting managing section 35 accepts from the risk analysis processing section 33 a recovery instruction for restoring the volume at the copy source for the remote copy for which a copy risk is to be determined and performs a process of restoring the volume at the copy source. The remote copy setting managing section 35 accepts from the risk analysis processing section 33 a shredding instruction for shredding the volume at the copy destination for the remote copy for which a copy risk is to be determined, deletes the volume at the copy destination, and deletes the copy pair information regarding the remote copy as a target.

The risk analysis processing section 33 accepts the designation of a volume (target volume) at the copy source by the administrator via the management terminal 2 and notifies the remote copy setting managing section 35 of an instruction for acquiring the data protection type of the target volume. The risk analysis processing section 33 then receives the data protection type of the target volume from the remote copy setting managing section 35. The risk analysis processing section 33 acquires the time zone setting information 46 of the storage system 10 at the copy destination from the storage managing system 11B at the copy destination. Note that the time zone setting information 46 may be acquired from the storage managing system 11B by way of Hypertext Transfer Protocol Secure (HTTPS) communication or according to a unique protocol when the copy pair is generated, for example. The risk analysis processing section 33 refers to the time zone setting information 46, the risk table 42, and the distance table 43, performs an analyzing process of analyzing whether a region as the copy destination where the target volume is to be placed involves a risk (copy risk) or not with respect to requirements for data protection indicated by the data protection type about the target volume, and notifies the recommendation processing section 32 and the notifying section 31 of the risk analysis result 47.

Next, an outline of various types of processes performed by the computer system 1 will be described below.

Figure 10:
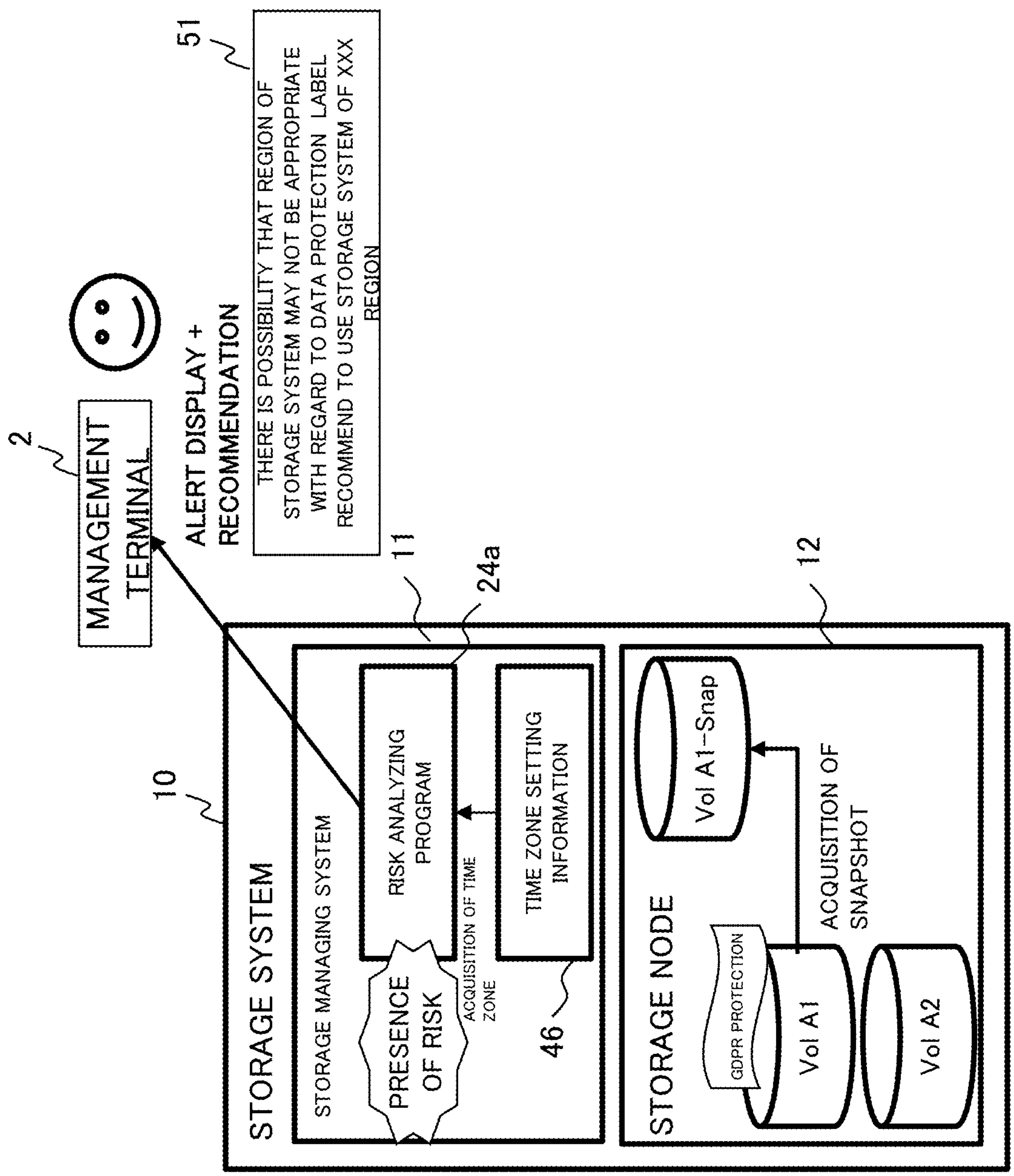
FIG. 10 is a block diagram illustrating an outline of a volume risk managing process according to the present embodiment.

FIG. 10 illustrates in block form an outline of a volume risk managing process according to the present embodiment.

The risk analyzing program 24*a* acquires region information from the time zone setting information 46, estimates the region of the storage node 12, and assesses a volume risk on the basis of the data protection type of the target volume.

If there is a volume risk, the risk analyzing program 24*a* outputs to the management terminal 2 an alert 51 indicating that the region of the storage system 10 where the volume is placed is not appropriate with respect to the data protection type. The risk analyzing program 24*a* may add recommendation information that recommends a storage system 10 in a copy risk-free region to the alert 51.

The risk analyzing program 24*a* performs a process of acquiring and storing a snapshot of a volume to be protected according to GDPR into the storage node 12 at a predetermined point of time.

Figure 11:
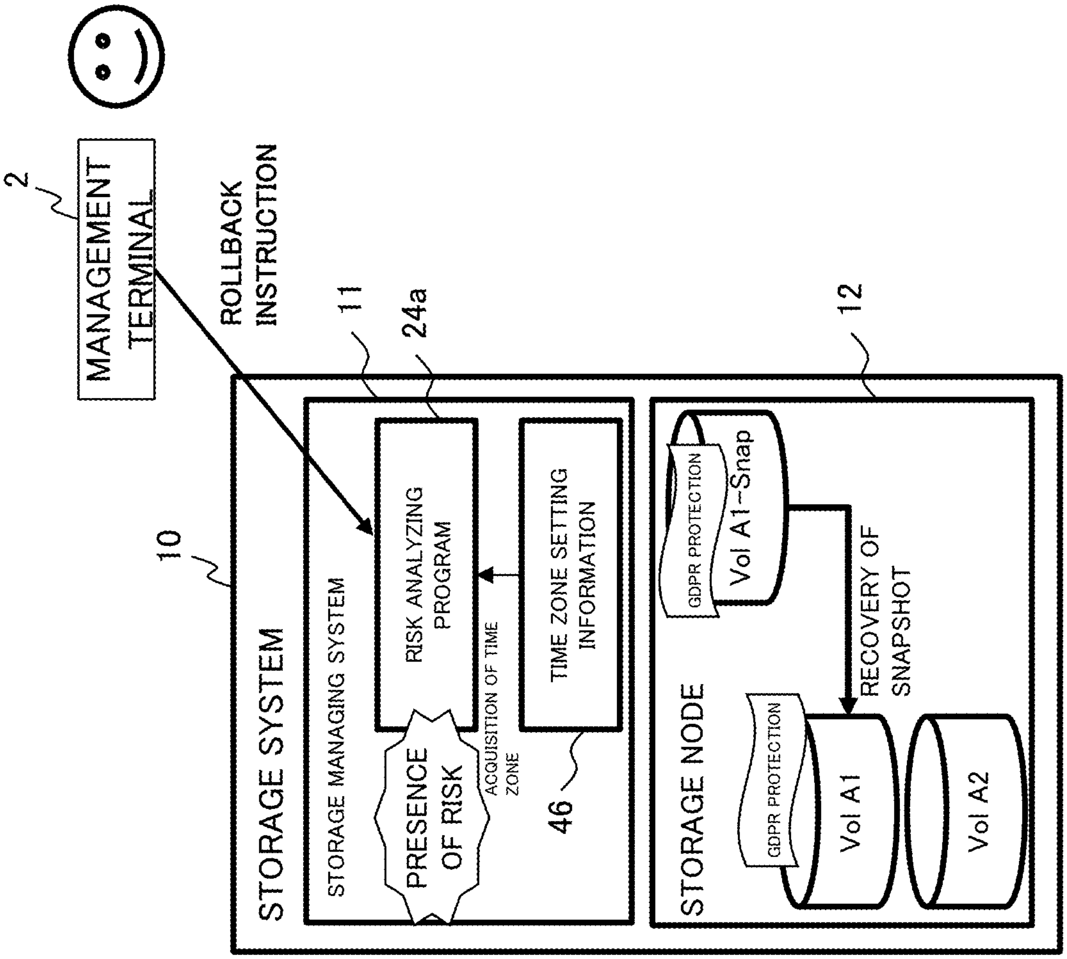
FIG. 11 is a block diagram illustrating an outline of a first processing operation performed after a volume risk has been detected according to the present embodiment.

FIG. 11 illustrates in block form an outline of a first processing operation performed after a volume risk has been detected according to the present embodiment.

After having output the alert 51 to the management terminal 2 in the presence of a volume risk, the risk analyzing program 24*a* can accept a recovery instruction (rollback instruction) for restoring the volume to a state at a predetermined point of time, e.g., at a point of time at which there was no volume risk, from the administrator via the management terminal 2. If the risk analyzing program 24*a* has accepted the recovery instruction for restoring the volume to the state at the predetermined point of time from the management terminal 2, then the risk analyzing program 24*a* restores the volume and also restores the volume protection type label of the volume to the label at the predetermined point of time on the basis of the snapshot at the predetermined point of time. Therefore, the volume can be restored to a state free of a volume risk.

Figure 12:
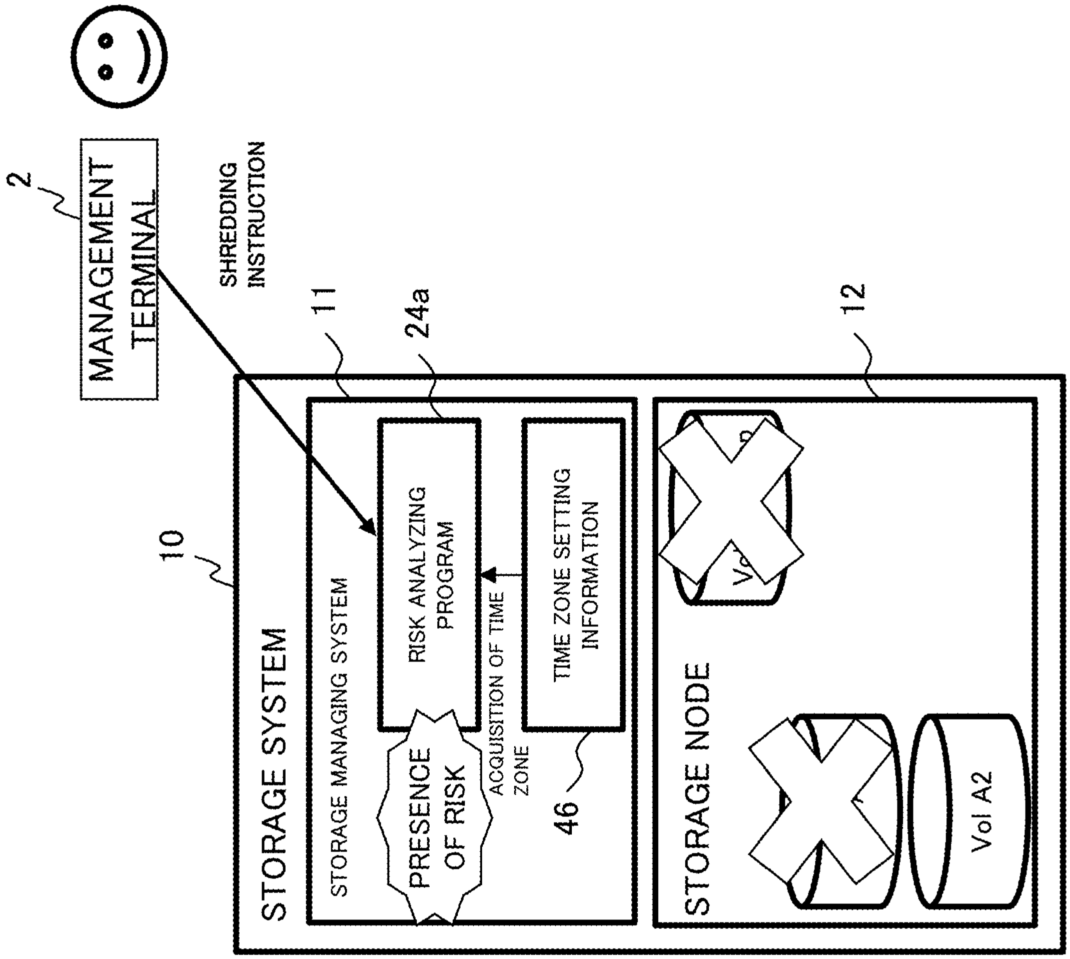
FIG. 12 is a block diagram illustrating an outline of a second processing operation performed after the volume risk has been detected according to the present embodiment.

FIG. 12 illustrates in block form an outline of a second processing operation performed after a volume risk has been detected according to the present embodiment.

After having output the alert 51 to the management terminal 2 in the presence of a volume risk, the risk analyzing program 24*a* can accept a volume shredding instruction (deletion instruction) for deleting a volume involving the volume risk from the administrator via the management terminal 2. If the risk analyzing program 24*a* has accepted the volume shredding instruction from the management terminal 2, then the risk analyzing program 24*a* deletes the volume involving the volume risk and the snapshot of the volume. Therefore, the volume involving the volume risk can appropriately be deleted from the storage node 12 in the region facing the risk.

Figure 13:
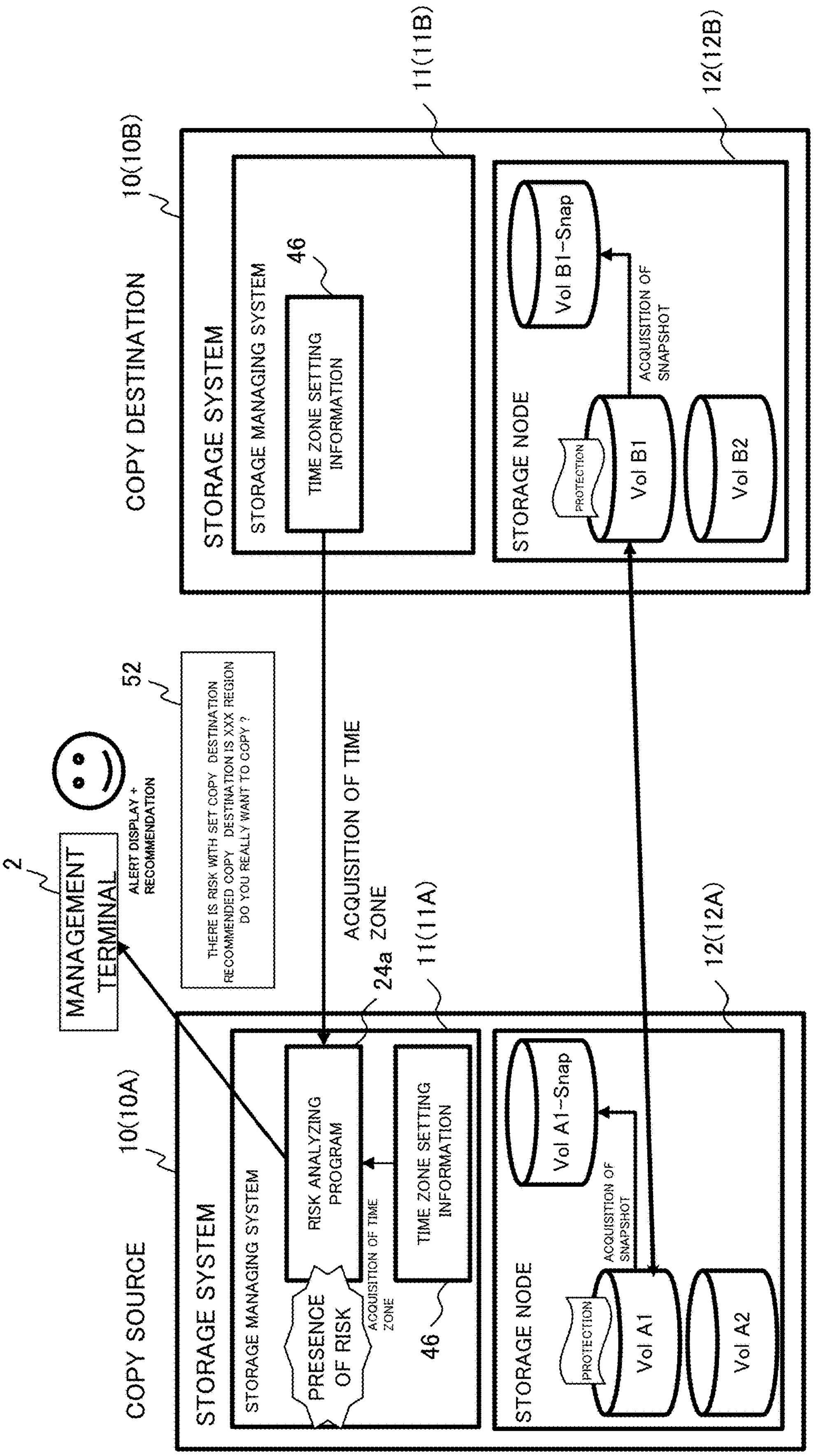
FIG. 13 is a block diagram illustrating an outline of a processing operation for copy risk assessment according to the present embodiment.

FIG. 13 illustrates in block form an outline of a processing operation for copy risk assessment according to the present embodiment.

The risk analyzing program 24*a* acquires region information from the time zone setting information 46 in the storage managing system 11 (11A in FIG. 13) of its own storage system 10 as the copy source, acquires region information from the time zone setting information 46 in the storage managing system 11 (11B in FIG. 13) of the storage system 10 (10B in FIG. 13) as the copy destination, estimates the regions of the storage nodes 12 of the copy source and the copy destination, and assesses a copy risk on the basis of the data protection type of the target volume at the copy source.

If there is a copy risk, then the risk analyzing program 24*a* outputs to the management terminal 2 an alert 52 indicating that the region of the storage system 10 of the copy destination for the volume is not appropriate with respect to the data protection type, for example. The risk analyzing program 24*a* may add recommendation information that recommends a storage system 10 in a region as a risk-free copy destination to the alert 52.

Figure 14:
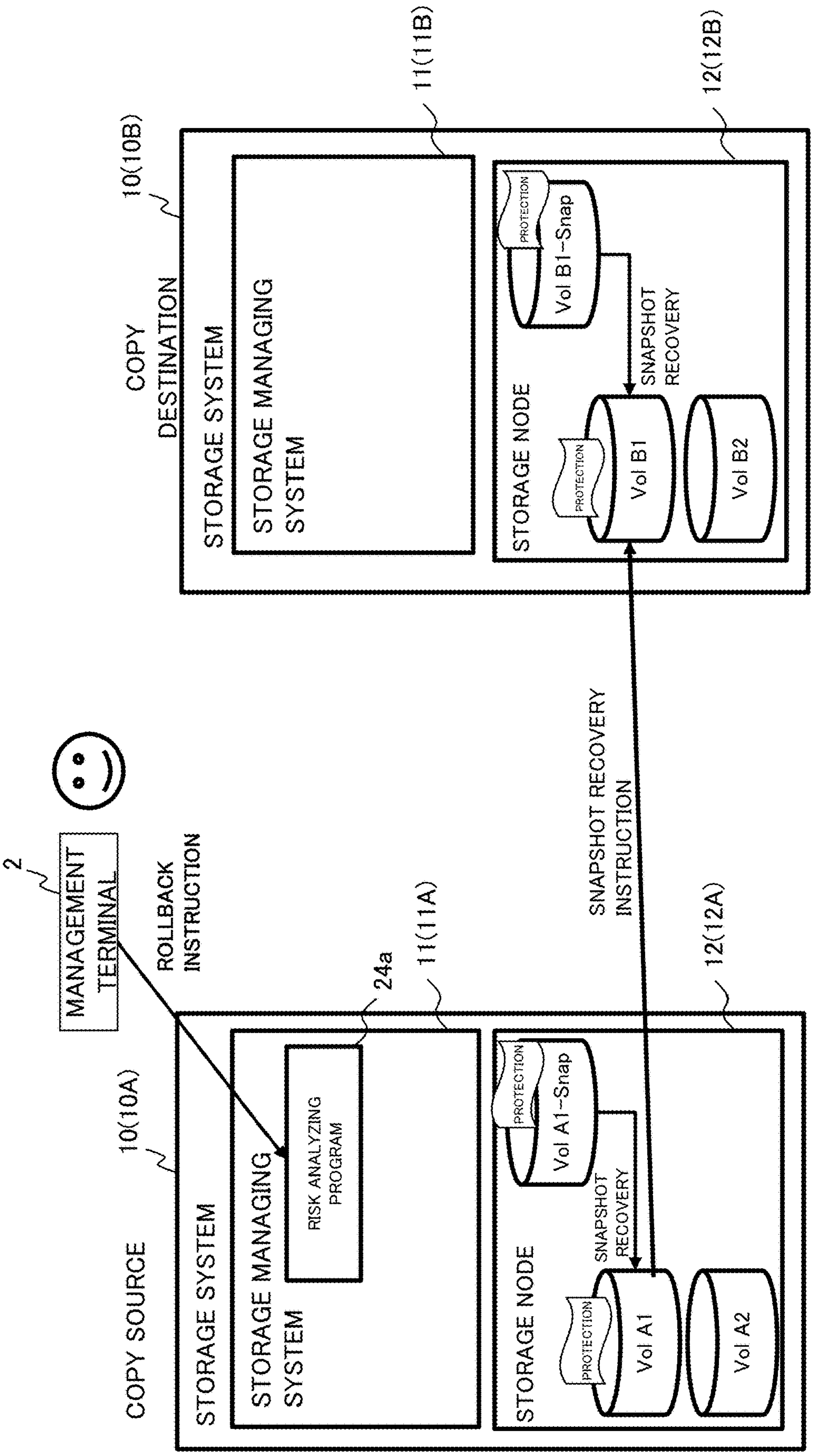
FIG. 14 is a block diagram illustrating an outline of a first processing operation performed after a copy risk has been detected according to the present embodiment.

FIG. 14 illustrates in block form an outline of a first processing operation performed after a copy risk has been detected according to the present embodiment.

After having output the alert 52 to the management terminal 2 in the presence of a copy risk, the risk analyzing program 24*a* can accept a recovery instruction for restoring the volume to a state at a predetermined point of time, e.g., at a point of time at which there was no copy risk, from the administrator via the management terminal 2. If the risk analyzing program 24*a* has accepted the recovery instruction for restoring the volume to the state at the predetermined point of time from the management terminal 2, then the risk analyzing program 24*a* restores the volume and also restores the volume protection type label of the volume to the label at the predetermined point of time on the basis of the snapshot at the corresponding point of time, and instructs the storage managing system 11 at the copy destination to restore the volume at the copy destination on the basis of the snapshot at the corresponding point of time. The storage managing system 11 at the copy destination thus restores the volume at the copy destination and restores the volume protection type label of the volume to the label at the point of time of the snapshot on the basis of the snapshot. Therefore, the volumes at the copy source and the copy destination can be restored to a state free of a copy risk.

Figure 15:
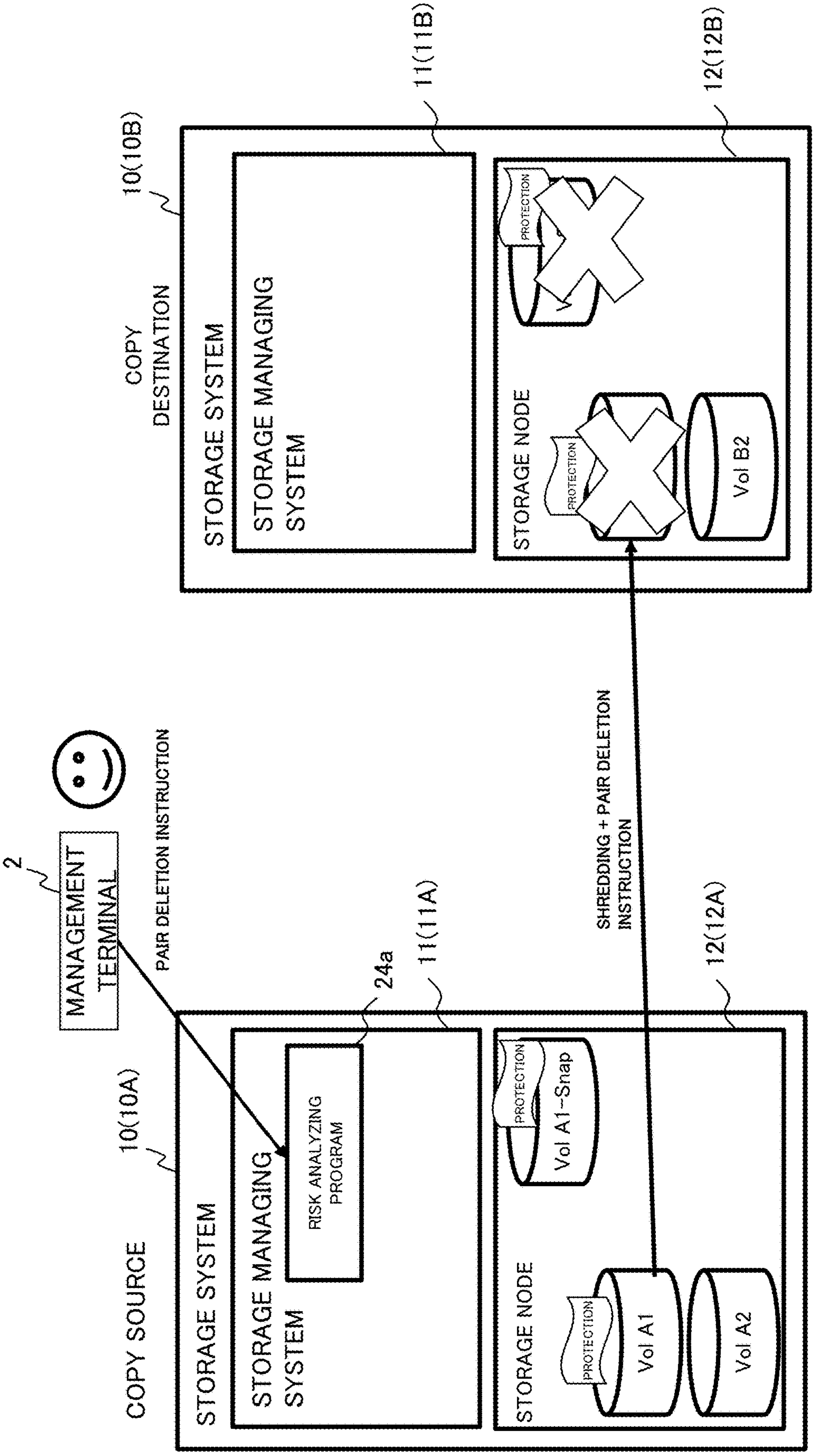
FIG. 15 is a block diagram illustrating an outline of a second processing operation performed after the copy risk has been detected according to the present embodiment.

FIG. 15 illustrates in block form an outline of a second processing operation performed after a copy risk has been detected according to the present embodiment.

After having output the alert 52 to the management terminal 2 in the presence of a copy risk, the risk analyzing program 24*a* can accept a volume shredding instruction for deleting the volume involving the copy risk at the copy destination from the administrator via the management terminal 2. If the risk analyzing program 24*a* has accepted the volume shredding instruction from the management terminal 2, then the risk analyzing program 24*a* deletes the copy pair information and sends the storage managing system 11 at the copy destination a volume shredding instruction for shredding a volume at the copy destination. According to the volume shredding instruction, the storage managing system 11 at the copy destination deletes the volume at the copy destination and also deletes the snapshot of the volume. Therefore, the volume involving the copy risk at the copy destination can appropriately be deleted from the storage node 12 in the region facing the risk.

Now, various types of processes performed by the computer system 1 will be described in detail below.

First, a volume setting process for setting a volume in the storage system 10 will be described below.

Figure 16:
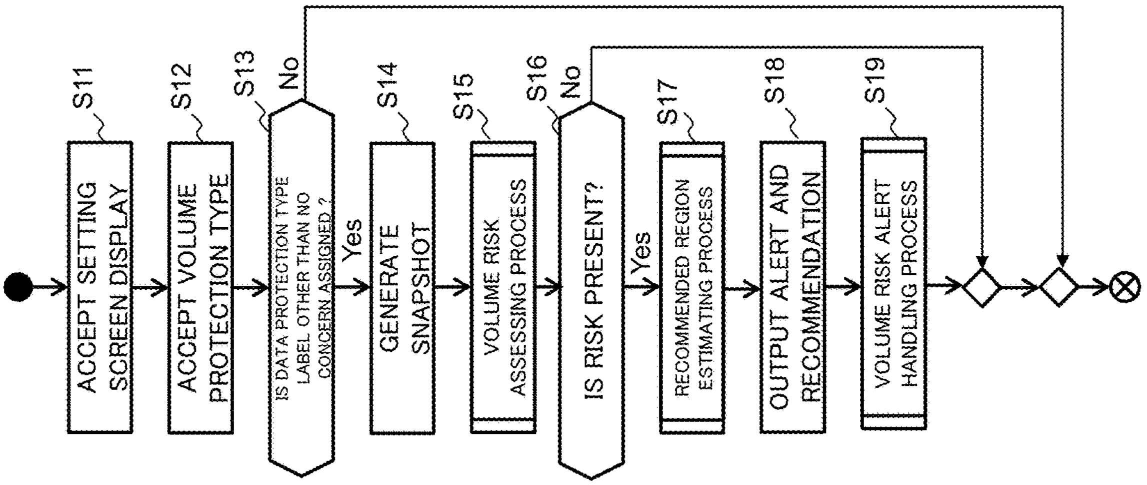
FIG. 16 is a flowchart of a volume setting process according to the present embodiment.

FIG. 16 is a flowchart of the volume setting process according to the present embodiment.

When the risk analyzing program 24*a* of the storage managing system 11 accepts a display instruction for displaying a volume setting screen from the management terminal 2, the risk analyzing program 24*a* controls the management terminal 2 to display the volume setting screen (S11). The volume setting screen accepts an instruction for generating a volume and the designation of a data protection type for the volume from the administrator via the management terminal 2.

The risk analyzing program 24*a* accepts the data protection type designated for the volume by the administrator from the management terminal 2 and sets a data protection type label for the volume (S12).

The risk analyzing program 24*a* determines whether a data protection type label other than the data protection type label representing no concern is assigned to the target volume or not (S13).

If the risk analyzing program 24*a* determines that a data protection type label other than the data protection type label representing no concern is not assigned, i.e., determines that the data protection type label representing no concern is assigned (S13: No), then the risk analyzing program 24*a* ends the volume setting process.

Conversely, if the risk analyzing program 24*a* determines that a data protection type label other than the data protection type label representing no concern is assigned (S13: Yes), then the risk analyzing program 24*a* creates a snapshot of the target volume (S14) and carries out a volume risk assessing process (see FIG. 17) for assessing whether the target volume involves a volume risk or not (S15).

Then, the risk analyzing program 24*a* determines whether the target volume involves a volume risk or not from a result of the volume risk assessing process (S16). If the risk analyzing program 24*a* determines that the target volume involves no volume risk (S16: No), then the risk analyzing program 24*a* brings the volume setting process to an end.

Conversely, if the risk analyzing program 24*a* determines that the target volume involves a volume risk (S16: Yes), then the risk analyzing program 24*a* carries out a recommended region estimating process (see FIG. 18) for estimating the region of a storage system 10 free of a volume risk (S17).

Then, the risk analyzing program 24*a* outputs to the management terminal 2 an alert for raising attention to the volume risk and a recommendation that recommends a region free of a volume risk (S18). The administrator is now able to appropriately recognize the presence of the volume risk and to identify a risk-free storage system 10.

Then, the risk analyzing program 24*a* carries out a volume risk alert handling process (see FIG. 19) (S19), whereupon the risk analyzing program 24*a* ends the volume setting process.

The volume risk assessing process carried out in step S15 will be described below.

Figure 17:
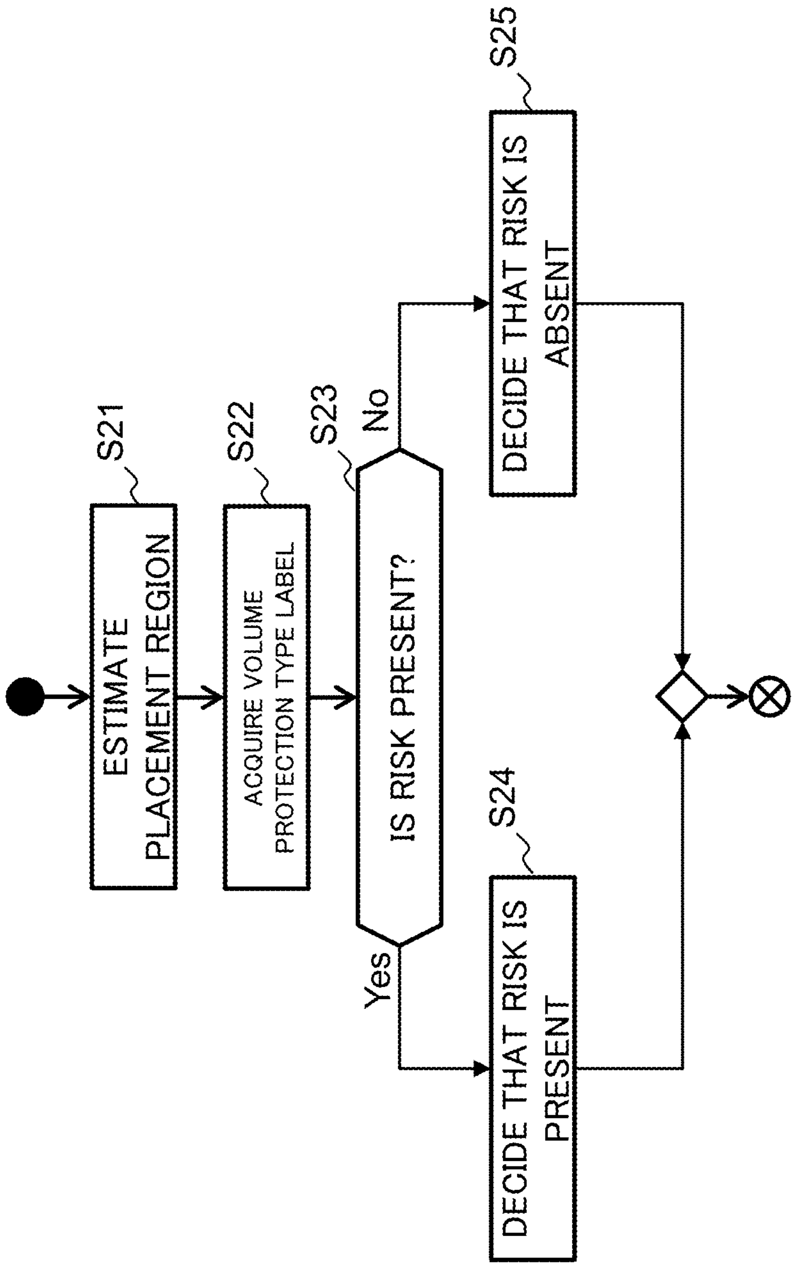
FIG. 17 is a flowchart of a volume risk assessing process according to the present embodiment.

FIG. 17 is a flowchart of the volume risk assessing process according to the present embodiment.

The risk analyzing program 24*a* refers to the time zone setting information 46, acquires the region information regarding the storage system 10, and estimates the region where the storage system 10 is placed (S21). Then, the risk analyzing program 24*a* acquires the data protection type label of the target volume (S22).

Then, the risk analyzing program 24*a* refers to the risk table 42 on the basis of the region where the storage system 10 is placed and the data protection type label of the target volume and determines whether there is a risk or not (S23). If the risk analyzing program 24*a* determines that there is a risk (S23: Yes), then the risk analyzing program 24*a* decides that a risk is present for a risk analysis result (S24) and ends the volume risk assessing process. Conversely, if the risk analyzing program 24*a* determines that there is no risk (S23: No), then the risk analyzing program 24*a* decides that a risk is absent for a risk analysis result (S25) and ends the volume risk assessing process.

The recommended region estimating process carried out in step S17 will be described below.

Figure 18:
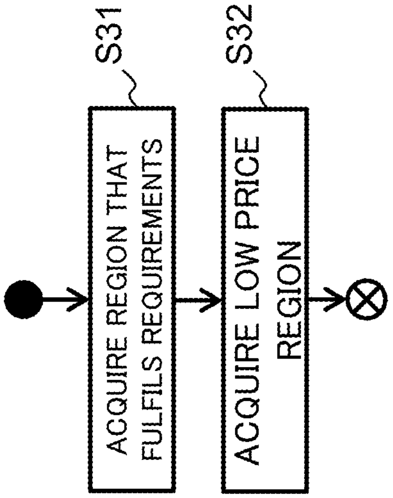
FIG. 18 is a flowchart of a recommended region estimating process according to the present embodiment.

FIG. 18 is a flowchart of the recommended region estimating process according to the present embodiment.

The risk analyzing program 24*a* refers to the requirement fulfilling region table 44 and acquires the names of regions that fulfill requirements, on the basis of the data protection type label of the target volume (S31).

Then, the risk analyzing program 24*a* refers to the price table 45 and acquires a region of the lowest price from among the regions that fulfill the requirements as a recommended region (S32), whereupon the risk analyzing program 24*a* brings the recommended region estimating process to an end.

The volume risk alert handling process carried out in step S19 will be described below.

Figure 19:
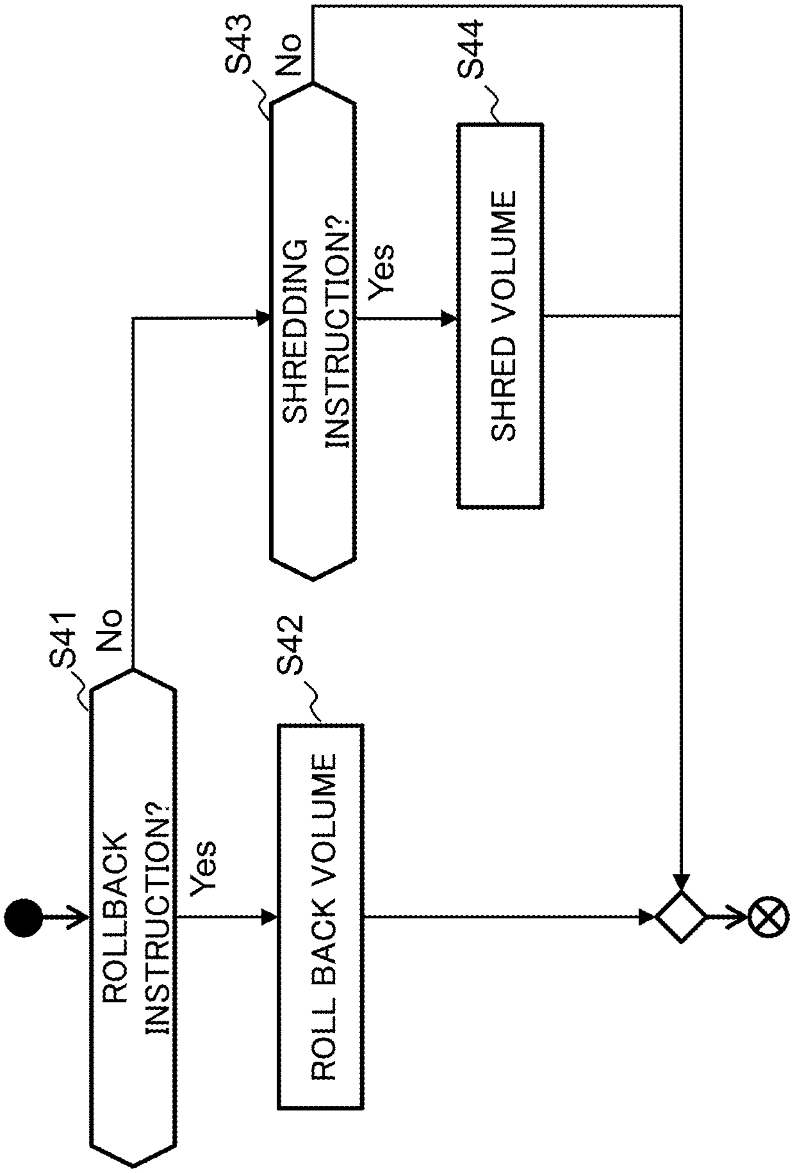
FIG. 19 is a flowchart of a volume risk alert handling process according to the present embodiment.

FIG. 19 is a flowchart of the volume risk alert handling process according to the present embodiment.

The risk analyzing program 24*a* determines whether it has accepted a rollback instruction for rolling back the target volume from the management terminal 2 or not (S41).

If the risk analyzing program 24*a* has accepted the rollback instruction for rolling back the target volume (S41: Yes), then the risk analyzing program 24*a* selects a snapshot indicated by the rollback instruction and rolls back the target volume with the selected snapshot (S42), whereupon the risk analyzing program 24*a* ends the volume risk alert handling process.

Conversely, if the risk analyzing program 24*a* has not accepted the rollback instruction (S41: No), then the risk analyzing program 24*a* determines whether it has accepted a shredding instruction for shredding the target volume from the management terminal 2 or not (S43).

As a result of this, if the risk analyzing program 24*a* has accepted the shredding instruction (S43: Yes), then the risk analyzing program 24*a* shreds the target volume (S44) and ends the volume risk alert handling process. Conversely, if the risk analyzing program 24*a* has not accepted the shredding instruction (S43: No), then the risk analyzing program 24*a* ends the volume risk alert handling process.

According to the volume risk alert handling process, in a case where there is a volume risk, the target volume can be restored to a state at a predetermined point of time or can be deleted.

A copy setting process for making a setting for performing a session for remotely copying a volume in the storage system 10 to another storage system 10 will be described below.

Figure 20:
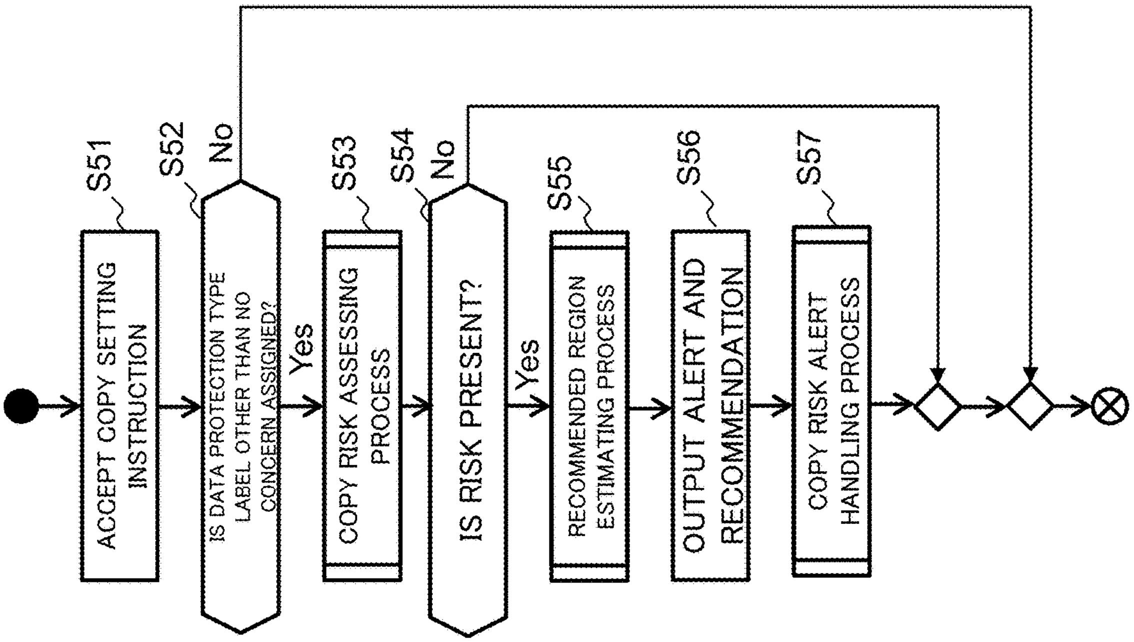
FIG. 20 is a flowchart of a copy setting process according to the present embodiment.

FIG. 20 is a flowchart of the copy setting process according to the present embodiment.

The risk analyzing program 24*a* accepts an instruction for making a remote copy setting from the administrator via the management terminal 2 (S51). The instruction for making a remote copy setting includes a volume at a copy source and the designation of a storage system 10 as a copy destination, for example.

The risk analyzing program 24*a* determines whether a data protection type label other than the data protection type label representing no concern is assigned to the volume at the copy source (copy source volume) or not (S52).

As a result of this, if the risk analyzing program 24*a* determines that a data protection type label other than the data protection type label representing no concern is not assigned, i.e., determines that the data protection type label representing no concern is assigned (S52: No), then the risk analyzing program 24*a* brings the copy setting process to an end.

Conversely, if the risk analyzing program 24*a* determines that the data protection type label other than the data protection type label representing no concern is assigned (S52: Yes), then the risk analyzing program 24*a* carries out a copy risk assessing process (see FIG. 21) for assessing whether remote copy to be set (target remote copy) poses a risk (copy risk) or not (S53).

Then, the risk analyzing program 24*a* determines whether the target remote copy involves a copy risk or not from a result of the copy risk assessing process (S54).

As a result of this, if the risk analyzing program 24*a* determines that the target remote copy does not involve a copy risk (S54: No), then the risk analyzing program 24*a* ends the copy setting process.

Conversely, if the risk analyzing program 24*a* determines that the target remote copy involves a copy risk (S54: Yes), then the risk analyzing program 24*a* carries out a recommended region estimating process (see FIG. 18) for estimating the region of a storage system 10 free of a copy risk at the copy destination (S55). Incidentally, according to the recommended region estimating process, in step S31, the risk analyzing program 24*a* refers to the requirement fulfilling region table 44 and acquires the names of regions that fulfill requirements, on the basis of the data protection type of the volume at the copy source and the region information of the volume at the copy destination.

Then, the risk analyzing program 24*a* outputs to the management terminal 2 an alert for raising attention to the copy risk and a recommendation that recommends a region free of a copy risk (S56). The administrator is now able to appropriately recognize the presence of the copy risk and to recognize a risk-free storage system 10 at the copy destination.

Then, the risk analyzing program **24*a* carries out a copy risk alert handling process (see FIG. 22) (S57**) and ends the copy setting process.

The copy risk assessing process carried out in step S53 will be described below.

Figure 21:
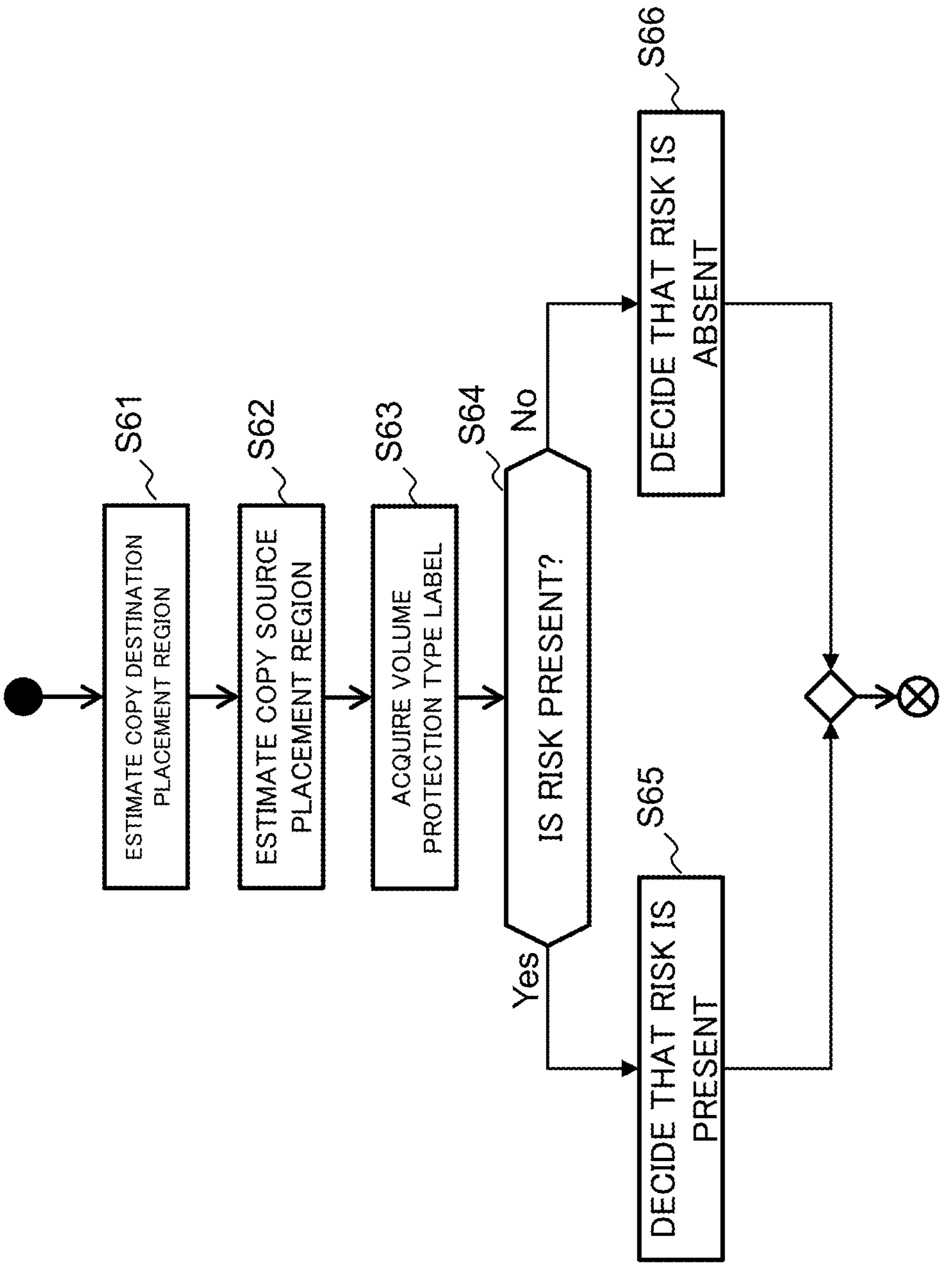
FIG. 21 is a flowchart of a copy risk assessing process according to the present embodiment.

FIG. 21 is a flowchart of the copy risk assessing process according to the present embodiment.

The risk analyzing program **24*a* acquires the time zone setting information 46 from the storage system 10 at the copy destination and estimates the region where the storage system 10 at the copy destination is placed (S61). Then, the risk analyzing program 24*a* refers to the time zone setting information 46 from the storage system 10 at the copy source, acquires the region information of the storage system 10, and estimates the region where the storage system 10 is placed (S62). Then, the risk analyzing program 24*a* acquires the data protection type label at the copy source (S63**).

Then, the risk analyzing program **24*a* refers to the risk table 42 on the basis of the region where the storage systems 10 at the copy source and the copy destination are placed and the data protection type of the target volume and determines whether there is a risk or not (S64). For example, in a case where the data protection type represents disaster protection (country), if the country to which the region of the storage system 10 at the copy source belongs and the country to which the region of the storage system 10 at the copy destination belongs are the same, then the risk analyzing program 24*a* determines that there is a risk, and if those countries are not the same, then the risk analyzing program 24*a* determines that there is not a risk. In a case where the data protection type represents disaster protection (distance), the risk analyzing program 24*a* specifies the distance between the region of the storage system 10 at the copy source and the region of the storage system 10 at the copy destination by referring to the distance table 43. If the specified distance is shorter than a predetermined distance, e.g., 500 km, in view of disaster protection, then the risk analyzing program 24*a* determines that there is a risk, and if the specified distance is equal to or longer than 500 km, then the risk analyzing program 24*a*** determines that there is not a risk.

In step S64, if the risk analyzing program **24*a* determines that there is a risk (S64: Yes), then the risk analyzing program 24*a* decides that a risk is present for a risk analysis result (S65) and ends the copy risk assessing process. Conversely, if the risk analyzing program 24*a* determines that there is no risk (S64: No), then the risk analyzing program 24*a* decides that a risk is absent for a risk analysis result (S66**) and ends the copy risk assessing process.

Next, the copy risk alert handling process carried out in step S57 will be described below.

Figure 22:
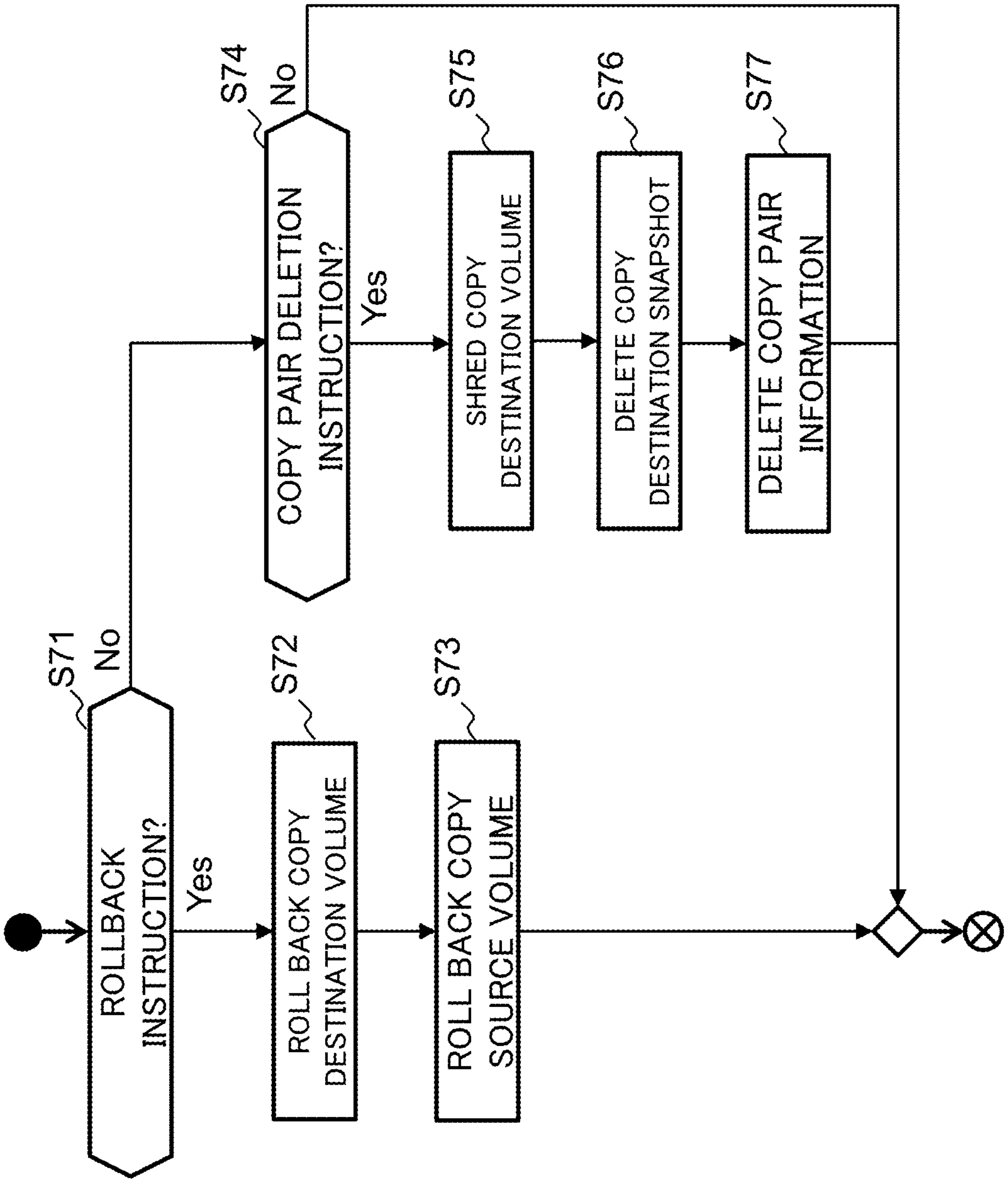
FIG. 22 is a flowchart of a copy risk alert handling process according to the present embodiment.

FIG. 22 is a flowchart of the copy risk alert handling process according to the present embodiment.

The risk analyzing program **24*a* determines whether it has accepted a rollback instruction for rolling back the volume to be remotely copied from the management terminal 2 or not (S71**).

As a result of this, if the risk analyzing program **24*a* has accepted the rollback instruction for rolling back the volume (S71: Yes), then the risk analyzing program 24*a* selects a snapshot at the copy destination indicated by the rollback instruction, rolls back the volume at the copy destination with the selected snapshot (S72), then selects a snapshot at the copy source indicated by the rollback instruction, and rolls back the volume at the copy source with the selected snapshot (S73), whereupon the risk analyzing program 24*a*** ends the copy risk alert handling process.

Conversely, if the risk analyzing program **24*a* has not accepted the rollback instruction for rolling back the volume to be remotely copied (S71: No), then the risk analyzing program 24*a* determines whether it has accepted an instruction for deleting the copy pair information of the volume to be remotely copied from the management terminal 2 or not (S74**).

If the risk analyzing program **24*a* has accepted the instruction for deleting the copy pair information (S74: Yes), then the risk analyzing program 24*a* shreds the volume at the copy destination (S75), deletes the snapshot at the copy destination (S76), and deletes the copy pair information that the risk analyzing program 24*a* has been instructed to delete (S77), whereupon the risk analyzing program 24*a* ends the copy risk alert handling process. Conversely, if the risk analyzing program 24*a* has not accepted the instruction for deleting the copy pair information (S74: No), the risk analyzing program 24*a*** brings the copy risk alert handling process to an end.

According to the copy risk alert handling process, in a case where there is a copy risk, the volumes at the copy source and the copy destination can be restored to a state at a predetermined point of time, and the volume and the snapshot at the copy destination, and the copy pair information can be deleted.

Next, a pre-copying process for analyzing a copy risk, which is to be carried out before remote copy is actually performed, will be described below.

Figure 23:
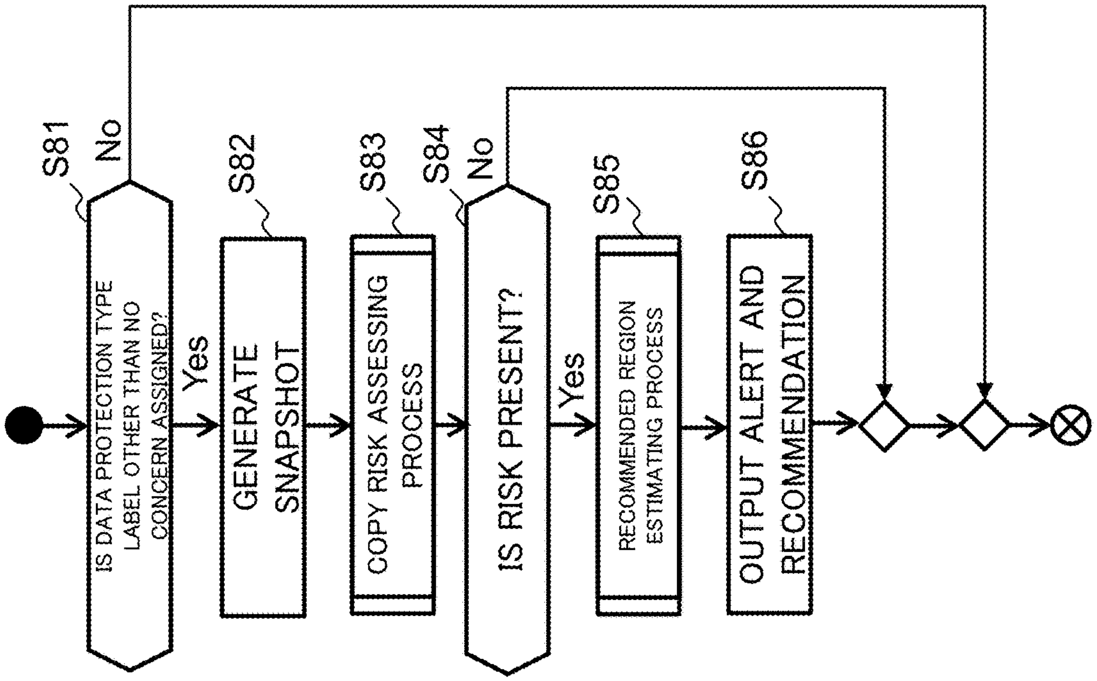
FIG. 23 is a flowchart of a pre-copying process according to the present embodiment.

FIG. 23 is a flowchart of the pre-copying process according to the present embodiment.

The risk analyzing program **24*a* determines whether a data protection type label other than the data protection type label representing no concern is assigned to the volume at the copy source or not (S81**).

As a result of this, if the risk analyzing program **24*a* determines that a data protection type label other than the data protection type label representing no concern is not assigned, i.e., determines that the data protection type label representing no concern is assigned (S81: No), then the risk analyzing program 24*a*** ends the pre-copying process.

Conversely, if the risk analyzing program **24*a* determines that a data protection type label other than the data protection type label representing no concern is assigned (S81: Yes), then the risk analyzing program 24*a* creates snapshots of the volumes at the copy source and the copy destination (S82) and carries out a copy risk assessing process (see FIG. 21) for assessing whether remote copy poses a risk or not (S83**).

Then, the risk analyzing programs **24*a* determines whether remote copy poses a copy risk or not from a result of the copy risk assessing process (S84**).

As a result of this, if the risk analyzing programs **24*a* determines that there is no copy risk (S84: No), the risk analyzing programs 24*a*** end the pre-copying process.

Conversely, if the risk analyzing programs **24*a* determines that there is a copy risk (S84: Yes), then the risk analyzing program 24*a* carries out a recommended region estimating process (see FIG. 18) for estimating the region of a storage system 10 at the copy destination free of a copy risk (S85). Incidentally, in the recommended region estimating process, in step S31, the risk analyzing program 24*a* refers to the requirement fulfilling region table 44 and acquires the names of regions that fulfill requirements, on the basis of the data protection type of the volume at the copy source and the region information of the volume at the copy destination (see step S31**).

Then, the risk analyzing program 24*a* outputs to the management terminal 2 an alert for raising attention to the copy risk and a recommendation that recommends a region at the copy destination free of a copy risk (S86), whereupon the risk analyzing program 24*a* brings the pre-copying process to an end. The administrator is accordingly able to appropriately recognize the presence of the copy risk and to identify a copy-risk-free storage system 10 at the copy destination before copy is made.

The present invention is not limited to the details of the present embodiment described above. Various changes and modifications may be made therein without departing from the scope of the invention.

For example, although regions that fulfill requirements are specified by referring to the requirement fulfilling region table 44 according to the present embodiment, the present invention is not limited to such details. According to the present invention, regions that fulfill requirements may be specified by referring to the risk table 42.

What is claimed is:

1. A storage managing system for managing a plurality of volumes such that a placement defining label that defines a region where data relative to each of the volumes is to be placed is assigned to the volume for management, comprising:

a processor configured to:

determine whether the region where data relative to a predetermined one of the volumes is to be placed is appropriate or not, on a basis of the placement defining label assigned to the predetermined volume, and output an alert indicating that the region where the data relative to the predetermined volume is to be placed is not appropriate, when determining that the region where the data is to be placed is not appropriate, wherein the processor is further configured to specify an appropriate region as the region where the data relative to the predetermined volume is to be placed and recommend the specified appropriate region, when determining that the region where the data is to be placed is not appropriate, and wherein the processor is further configured to: accept a rollback instruction for restoring the data placed in the region to a state at a predetermined point of time from a user, if the region is not appropriate, and restore the data to the state at the predetermined point of time on a basis of the rollback instruction.

2. The storage managing system according to claim 1, wherein the placement defining label includes at least one piece of information regarding legal restrictions that impose limitations on the region where the data relative to the predetermined volume is to be placed or information that imposes limitations on the region where the data relative to the predetermined volume is to be placed in view of disaster protection.

3. The storage managing system according to claim 1, wherein the processor is configured to specify a most appropriate region on a basis of a placement cost, providing there are a plurality of regions each as the specified appropriate region.

4. The storage managing system according to claim 1, wherein the data relative to the predetermined volume represents data on the volume itself.

5. The storage managing system according to claim 1, wherein the data relative to the predetermined volume represents data of a volume at a copy destination for the data of the volume.

6. The storage managing system according to claim 1, wherein the processor is configured to:

accept an instruction for deleting the data from the region where the data is to be placed from a user, if the region is not appropriate, and delete the data from the region on a basis of the instruction.

7. A storage managing method to be carried out by a storage managing system for managing a plurality of volumes such that a placement defining label that defines a position where data relative to each of the volumes is to be placed is assigned to the volume for management, comprising:

determining whether the position where data relative to a predetermined one of the volumes is to be placed is appropriate or not, on a basis of the placement defining label assigned to the predetermined volume; and outputting an alert indicating that the position where the data relative to the predetermined volume is to be placed is not appropriate, if it is determined that the position where the data is to be placed is not appropriate, wherein the method further comprises specifying an appropriate region as the region where the data relative to the predetermined volume is to be placed and recommending the specified appropriate region, when determining that the region where the data is to be placed is not appropriate, and wherein the method further comprises accepting a rollback instruction for restoring the data placed in the region to a state at a predetermined point of time from a user, if the region is not appropriate, and restoring the data to the state at the predetermined point of time on a basis of the rollback instruction.

8. A computer comprising a processor and a memory device that stores a storage managing program for managing a plurality of volumes to manage storage of the volumes such that a placement defining label that defines a position where data relative to each of the volumes is to be placed is assigned to the volume for management, wherein the storage managing program causes the processor to:

determine whether the position where data relative to a predetermined one of the volumes is to be placed is appropriate or not, on a basis of the placement defining label assigned to the predetermined volume; and output an alert indicating that the position where the data relative to the predetermined volume is to be placed is not appropriate, if it is determined that the position where the data is to be placed is not appropriate, wherein the processor is configured to specify an appropriate region as the region where the data relative to the predetermined volume is to be placed and recommend the specified appropriate region, when determining that the region where the data is to be placed is not appropriate, and wherein the processor is configured to: accept a rollback instruction for restoring the data placed in the region to a state at a predetermined point of time from a user, if the region is not appropriate, and restore the data to the state at the predetermined point of time on a basis of the rollback instruction.

* * * * *